United States Patent
Cho et al.

(10) Patent No.: US 7,670,421 B2
(45) Date of Patent: Mar. 2, 2010

(54) PENETRATION REINFORCING AGENT FOR PREVENTING AGING OF CONCRETE AND PROCESS FOR PREPARING THE SAME

(75) Inventors: Myung Sug Cho, Daejeon (KR); Young Chul Song, Daejeon (KR); Jong Ken Kim, Seoul (KR); Jae Ho Lim, Seoul (KR)

(73) Assignee: Korea Electric Power Corporation, Seoul (KR)

( * ) Notice: Subject to any disclaimer, the term of this patent is extended or adjusted under 35 U.S.C. 154(b) by 771 days.

(21) Appl. No.: 11/519,335

(22) Filed: Sep. 11, 2006

(65) Prior Publication Data

US 2007/0098911 A1    May 3, 2007

(30) Foreign Application Priority Data

Oct. 31, 2005  (KR) .................. 10-2005-0103420

(51) Int. Cl.
*D06M 15/643* (2006.01)
*C07F 7/18* (2006.01)
*B05D 1/02* (2006.01)
*B05D 1/28* (2006.01)

(52) U.S. Cl. .................. 106/287.11; 427/140
(58) Field of Classification Search .................. None
See application file for complete search history.

(56) References Cited

U.S. PATENT DOCUMENTS 3,932,339 A * 1/1976 McLeod .................. 524/783

FOREIGN PATENT DOCUMENTS

| JP | 2000-327987 | * 11/2000 |
| KR | 10-0189324 | 6/1999 |
| KR | 2001-0064300 | 7/2001 |

* cited by examiner

*Primary Examiner*—Jerry Lorengo
*Assistant Examiner*—Yun Qian
(74) *Attorney, Agent, or Firm*—Weaver Austin Villeneuve & Sampson LLP (57) ABSTRACT

A penetration reinforcing agent for preventing aging of concrete is prepared by using an inorganic silicate compound having an ethoxy or methoxy group and a monomer having a hydroxyl (OH) group. When the penetration reinforcing agent is applied onto the surface of a concrete structure it penetrates the concrete structure where it is hydrolyzed by water existing within the concrete to form silica ($SiO_2$) having a particle size of several nanometers, is gelled by a sol-gel process and reacts with concrete hydrates, so that internal pores of the concrete structure are compactly filled with the reaction products. The penetration reinforcing agent is effective in enhancing the strength of, inhibiting penetration of aging factors into, improving waterproofness of, and preventing neutralization of the concrete structure.

19 Claims, 2 Drawing Sheets

PENETRATION REINFORCING AGENT FOR PREVENTING AGING OF CONCRETE AND PROCESS FOR PREPARING THE SAME

BACKGROUND OF THE INVENTION

1. Field of the Invention

The present invention relates to a penetration reinforcing agent for preventing aging of concrete, a process for preparing the penetration reinforcing agent, and a method of applying the penetration reinforcing agent onto concrete. More specifically, the present invention relates to a penetration reinforcing agent for preventing aging of concrete which is prepared by using an inorganic silicate compound having an ethoxy or methoxy group and a monomer having a hydroxyl (OH) group, a process for preparing the penetration reinforcing agent, and a method of applying the penetration reinforcing agent onto concrete. When the penetration reinforcing agent of the present invention is applied onto the surface of a concrete structure by using a spray gun or a brush, it penetrates the concrete structure where it is hydrolyzed by water existing within the concrete to form silica ($SiO_2$) having a particle size of several nanometers, gelled by a sol-gel process and reacts with concrete hydrates, so that internal pores of the concrete structure are compactly filled with the reaction products. Therefore, the penetration reinforcing agent of the present invention is effective in enhancing the strength of the concrete structure, inhibiting penetration of aging materials into the concrete structure, improving waterproofness of the concrete structure and preventing neutralization of the concrete structure.

2. Description of the Related Art

In general, steel-reinforced concrete structures have been surface-coated with organic or inorganic materials in order to inhibit aging and improve the waterproof performance of the structures. Organic polymeric materials, such as silicone, epoxy and urethane resins, have been used as conventional penetration reinforcing agents. In the case where an organic polymeric material is used as a penetration reinforcing agent, vibration, water vapor pressure and difference in the elastic modulus between the penetration reinforcing agent and concrete cause various problems, such as destruction or peeling of coating layers. Further, organic polymeric materials possess fundamental limitations in their use because they are not integrated with concrete, which is an inorganic material.

Korean Patent Laid-open No. 1998-076357 discloses a method of preventing dewing in concrete buildings, the method comprising the steps of applying a silicone emulsion onto the surface of concrete to form a waterproof sealing layer inside the concrete surface, applying a cement-based compound onto the concrete surface, within which the waterproof sealing layer is formed, to form a waterproof coating layer, and plastering a mortar, which is prepared by replacing a portion of water with a silicone emulsion, on the said waterproof coating layer to form a mortar layer. According to this method, however, since the formation of the final waterproof layer involves three steps, considerable construction costs are incurred and construction period is extended. In addition, since there are large differences in the mechanical properties, such as strength, elastic modulus and stress-strain between the waterproof layer and the concrete, peeling and delamination of the waterproof layer from the concrete inevitably occur after the passage of a predetermined period of time.

Further, Korean Patent Laid-open No. 2001-0064300 discloses a penetrative waterproofing agent in which an aqueous alkali metal silicate solution is applied onto the surface of concrete to penetrate the concrete surface and the penetrated alkali metal silicate reacts with calcium hydroxide present in the concrete to form an insoluble gel, thus achieving waterproof effects. Especially, a silicate compound containing calcium as a divalent alkali metal, potassium and lithium, which is represented by a metal alkoxide, penetrates concrete to enhance the watertightness of the concrete, thus attaining waterproof effects. However, since water as a solvent is used in a large amount of 65 to 85% by weight in the above invention, the amounts of materials substantially reacting with the concrete are relatively small, causing deterioration in the performance of the waterproofing agent Further, since the alkali metal silicate, such as sodium silicate, potassium silicate or lithium silicate, rapidly reacts with the concrete, gelling occurs on the concrete surface before the waterproofing agent penetrates the concrete, and as a result, the waterproofing agent cannot be penetrated to an optimum depth as needed. Moreover, the above waterproofing agent cannot prevent decomposition of the concrete arising from seasonal variations due to its hydrophilicity.

SUMMARY OF THE INVENTION

Therefore, the present invention has been made in view of the above problems, and it is an object of the present invention to provide a process for preparing a penetration reinforcing agent that overcomes the disadvantages of conventional organic waterproof coating materials and silicate-based waterproof/repair materials, and that forms a potent protective layer capable of protecting the inner and outer portions of concrete from various aging factors while improving the durability performance of a concrete structure.

In accordance with an aspect of the present invention for achieving the above object, there is provided a process for preparing a penetration reinforcing agent, the process comprising the steps of mixing a silicate compound with one or more monomers to prepare a composition A, mixing a silicate compound with an amine compound to prepare a composition B, mixing the said composition A with the said composition B to prepare a composition C, mixing the composition C with a silane compound to prepare a composition D, adding phenolphthalein to ethanol to prepare a composition E, and mixing the said composition D with the said composition E to prepare the penetration reinforcing agent

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

The step of preparing the composition A includes the following sub-steps of: sequentially adding at least one silicate compound selected from the group consisting of tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate and octadecyltriethoxyorthosilicate, at least one monomer selected from the group consisting of tert-butyl acrylate, methyl methacrylate and hydroxyethyl acrylate, and an appropriate amount of a reaction catalyst to a reactor (first sub-step); stirring the mixture while introducing nitrogen gas into the reactor (second sub-step); sustaining the reaction until the amount of ethanol discharged through a reflux condenser from the reactor becomes constant while maintaining the internal temperature of the reactor constant (third sub-step); and stopping the introduction of the nitrogen gas at a specific time point and lowering the temperature of the reaction product to 40° C. or less (fourth sub-step).

The first sub-step is preferably carried out by mixing 50 to 95% by weight of the silicate compound with 5 to 50% by weight of the monomer. The second sub-step is preferably carried out by stirring the mixture at a speed of 30-100 rpm. The third sub-step is preferably carried out by allowing the mixture to react for 5-10 hours while maintaining the internal temperature of the reactor at 60-100° C. In the fourth sub-step, the specific time point is preferably when ethanol is not discharged from the reactor any further or is discharged in an amount of less than 20% of the amount discharged at the initial stage of the reaction.

The step of preparing the composition B includes the following sub-steps of: sequentially adding at least one silicate compound selected from the group consisting of tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate and octadecyltriethoxyorthosilicate, and diethanolamine, and an appropriate amount of a reaction catalyst to a reactor (first sub-step); stirring the mixture while introducing nitrogen gas into the reactor (second sub-step); sustaining the reaction until the amount of ethanol discharged through a reflux condenser from the reactor becomes constant while maintaining the internal temperature of the reactor constant (third sub-step); and stopping the introduction of the nitrogen gas at a specific time point and lowering the temperature of the reaction product to 40° C. or less (fourth sub-step).

The first sub-step is preferably carried out by mixing 50 to 95% by weight of the silicate compound with 5 to 50% by weight of diethanolamine. The second sub-step is preferably carried out by stirring the mixture at a speed of 30-100 rpm. The third sub-step is preferably carried out by allowing the mixture to react for 5-10 hours while maintaining the internal temperature of the reactor at 60-100° C. In the fourth sub-step, the specific time point is preferably when ethanol is not discharged from the reactor any further or is discharged in an amount of less than 5% of the amount discharged at the initial stage of the reaction.

The step of preparing the composition C is preferably carried out by mixing at least 50% by weight of the composition A with less than 50% by weight of the composition B and stirring the mixture at 30-100 rpm for 10-60 minutes. The step of preparing the composition C is more preferably carried out by mixing 70 to 90% by weight of the composition A with 10 to 30% by weight of the composition B and stirring the mixture at 40-80 rpm for 20-40 minutes.

The step of preparing the composition D is preferably carried out by adding less than 50% by weight of at least one silane compound selected from the group consisting of isobutyltriethoxysilane, isobutyltrimethoxysilane and n-octyltriethoxysilane to the said composition C and stirring the mixture at 30-100 rpm for 10-60 minutes. The step of preparing the composition D is more preferably carried out by adding 10 to 30% by weight of at least one silane compound selected from the group consisting of isobutyltriethoxysilane, isobutyltrimethoxysilane and n-octyltriethoxysilane to the said composition C and stirring the mixture at 40-80 rpm for 20-40 minutes.

The step of preparing the composition E is preferably carried out by adding 0.5 g to 10 g of phenolphthalein to 90 g to 99.5 g of ethanol having a purity of 95% or higher and stirring the mixture. The step of preparing the composition E is more preferably carried out by adding 1.0 g to 1.5 g of phenolphthalein to 95 g to 98.6 g of ethanol having a purity of 95% or higher and stirring the mixture.

The step of mixing the composition D with the composition E is preferably carried out by mixing less than 50% by weight of the composition E with the composition D and stirring the mixture. The step of mixing the composition D with the composition E is more preferably carried out by mixing 5 to 20% by weight of the composition E with the composition D and stirring the mixture.

The present invention also provides a penetration reinforcing agent prepared by the above process. The present invention also provides a method of applying the penetration reinforcing agent onto concrete by using an instrument selected from sprayer, roller, brush and spray gun 28 days after casting of the concrete.

The silicate compound, which is used as a basic constituent material of the penetration reinforcing agent according to the present invention, possesses a binding mechanism based on a sol-gel process. When the silicate compound penetrates concrete, it mitigates a violent reaction with calcium hydroxide ($Ca(OH)_2$) so that the penetration is conducted to a sufficient depth. The silicate compound and the monomer serve to inhibit decomposition of concrete arising from seasonal variations. According to the penetration reinforcing agent of the present invention, the total amount of active ingredients binding to concrete is 80 to 100% by weight. Since most of the constituent materials of the penetration reinforcing agent react with concrete, reinforcement of the concrete is achieved, aging of the concrete is inhibited and an efficient waterproof layer is formed.

Hereinafter, preferred embodiments of the present invention will be explained in detail with reference to the accompanying drawings.

Figure 1:
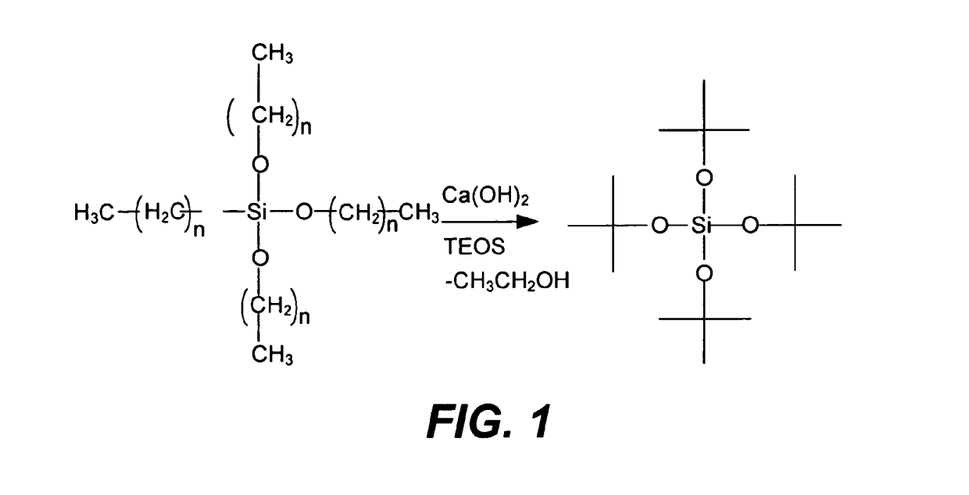
FIG. 1 is a reaction scheme in which tetraethylorthosilicate contained in a penetration reinforcing agent of the present invention reacts with calcium hydroxide present in concrete.
Figure 2:
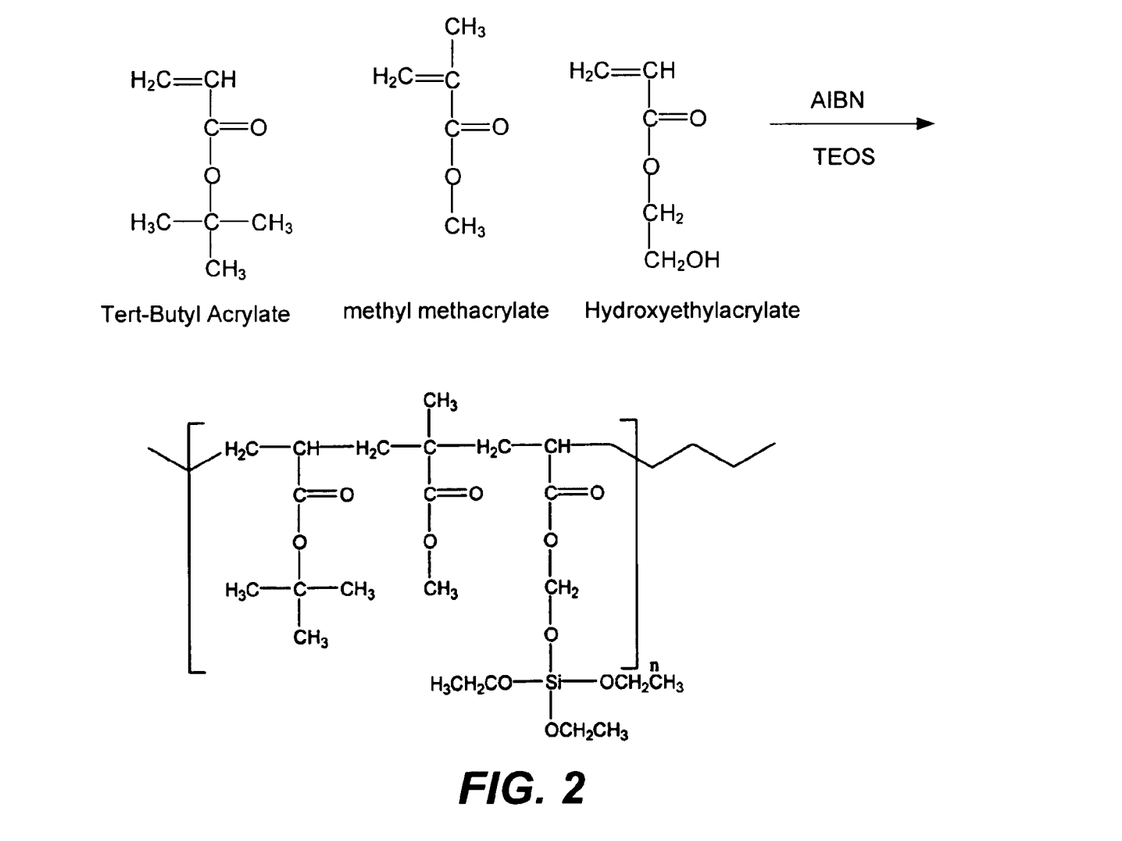
FIG. 2 is a reaction scheme in which hydroxyethyl acrylate, tert-butyl acrylate and methyl methacrylate as monomers are copolymerized with a silicate compound by using AIBN as a polymerization initiator.
Figure 3:
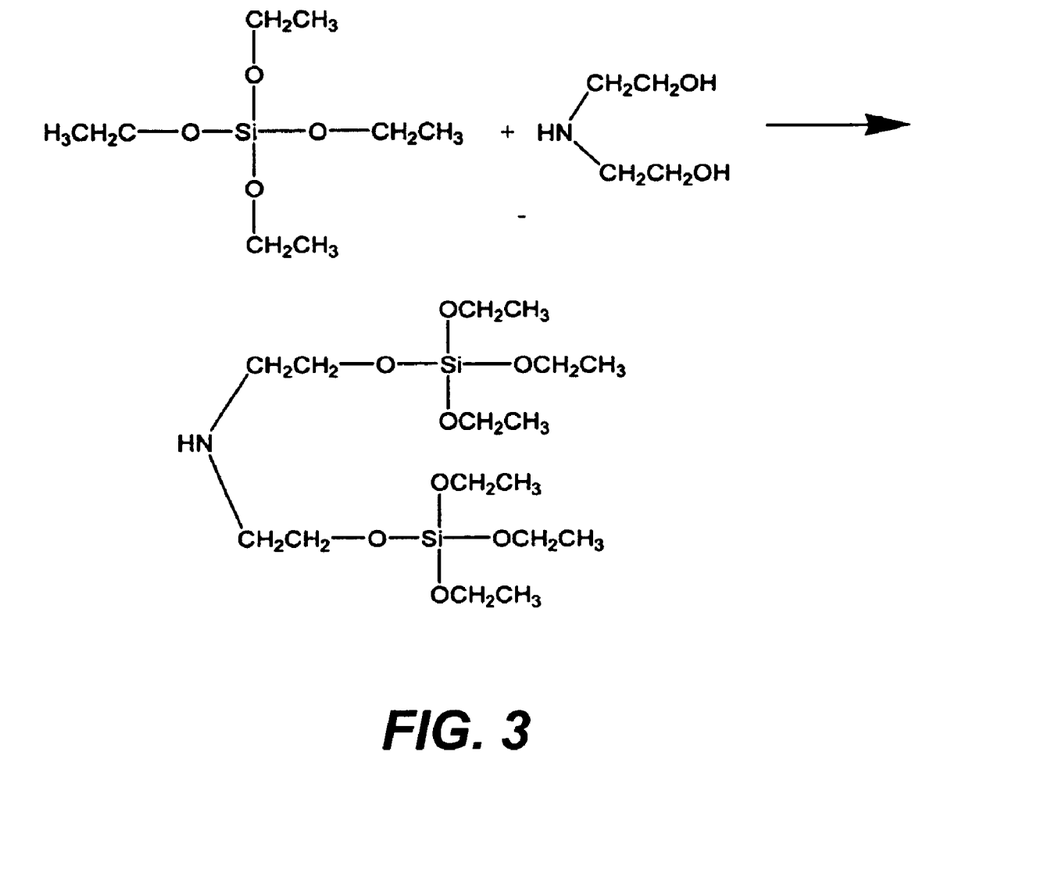
FIG. 3 is a reaction scheme in which a silicate compound reacts with an amine compound.

FIG. 1 is a reaction scheme in which tetraethylorthosilicate contained in the penetration reinforcing agent of the present invention reacts with calcium hydroxide present in concrete. FIG. 2 is a reaction scheme in which hydroxyethyl acrylate, tert-butyl acrylate and methyl methacrylate as a monomer are copolymerized with a silicate compound by using AIBN as a polymerization initiator. FIG. 3 is a reaction scheme in which a silicate compound reacts with an amine compound.

The penetration reinforcing agent of the present invention is composed of an inorganic silicate moiety having a methoxy or ethoxy group and a polymeric moiety having such functional group. Silicate compounds having a methoxy or ethoxy group react with calcium hydroxide present in concrete to lose the corresponding alcohol component and then react in the form of gel state. Likewise, polymeric materials having a methoxy or ethoxy group are crosslinked to be gelled. Consequently, the composition reacts with calcium hydroxide, acting as a catalyst, present in concrete to be naturally formed into an organic/inorganic complex.

Inorganic materials, such as alkali metal silicate compounds, have been used in concrete structures for the purpose of enhancing the strength of concrete. When such inorganic materials penetrate into concrete, they are gelled and fill pores of the concrete, thus enhancing the strength of the concrete. However, the inorganic materials have poor water resistance due to their hydrophilicity and cannot absorb impact energy resulting from an impact applied to concrete so that particles bound to the concrete are destroyed.

To solve these disadvantages, a silicate compound, such as tetraethylorthosilicate or tetramethylorthosilicate, is used in the present invention. Referring to FIG. 1, the silicate compound reacts with calcium hydroxide within concrete to lose an alcohol and become a gel state (i.e. crosslinked). In FIG. 1, TEOS-$CH_3CH_2OH$ represents that tetraethylorthosilicate loses ethanol. When silane materials, such as isobutyltriethoxysilane, isobutyltrimethoxysilane and n-octyltriethoxysilane, penetrate concrete, they react with calcium hydroxide to form crosslinked materials, as shown in FIG. 1. The crosslinked materials are water-repellent due to the presence of organic groups therein, such as butyl and octyl groups. Since the silicate compound has a methoxy or ethoxy group, it readily reacts with materials having a hydroxyl group to lose methanol or ethanol if a catalyst is present and to form a bond. When tetraethylorthosilicate or tetramethylorthosilicate having four functional groups reacts with a compound having several hydroxyl groups, gelling occurs. Proper control of the functional groups enables prevention of gelling and preparation of a polymer having an appropriate viscosity.

Referring to FIG. 2, when the monomer having a hydroxyl group is copolymerized with a silicate compound by using a polymerization initiator, such as AIBN, the monomers having a double bond form a polymer. Specifically, when hydroxyethyl acrylate, tert-butyl acrylate and methyl methacrylate as a monomer are copolymerized with a silicate compound, such as tetraethylorthosilicate or tetramethylorthosilicate, using a polymerization initiator, such as AIBN, the monomers having a double bond form a polymer and the tetraethylorthosilicate or tetramethylorthosilicate reacts with the hydroxyethyl acrylate to form a polymer having an ethoxy group. In FIG. 2, TEOS represents tetraethylorthosilicate. The reaction mechanism shown in FIG. 2 arises when tetraethylorthosilicate, monomers (ie. tert-butyl acrylate, methyl methacrylate and hydroxyethyl acrylate) and AIBN as a reaction catalyst are sequentially added to a polymerization reactor.

If the silicate compound, such as tetraethylorthosilicate or tetramethylorthosilicate, is present in an excessively large amount, it readily reacts with an amine compound having a hydroxyl group to form a polymeric compound, as shown in FIG. 3. Since such polymer contains an amine group, it causes a crosslinking reaction in concrete that is already neutralized or being neutralized, making the concrete alkaline. As a result, neutralization of the concrete and corrosion of steel are inhibited. The reaction mechanism shown in FIG. 3 arises when an excess of a silicate compound, such as tetraethylorthosilicate or tetramethylorthosilicate, and diethanolamine having a hydroxyl group are sequentially added to a reactor.

The penetration reinforcing agent of the present invention is a highly functional, surface-treating agent for improving the performance of concrete that is capable of recovering durability performance of concrete and imparting waterproof performance to concrete. Where a concrete structure is surface-treated with a polymeric compound having a silicate moiety, it is important for the polymeric compound to penetrate the concrete structure as deep as possible. To this end, it is advantageous that the polymeric compound have a low viscosity. That is, a polymeric compound having a low-viscosity silicate moiety is suitable in terms of penetration depth. Of course, a polymeric compound with a low viscosity has a relatively low molecular weight. However, since the polymeric compound has a silicate moiety, it is converted into a crosslinked material by the action of the silicate moiety after it penetrates concrete, resulting in no disadvantageous physical properties.

Therefore, the highly functional penetration reinforcing agent of the present invention, which forms a potent protective layer capable of protecting the inner and outer portions of concrete from penetration of various aging factors while improving the durability performance of a concrete structure, is prepared by copolymerizing a mediating compound (e.g., tetraethylorthosilicate or tetramethylorthosilicate) with monomers (e.g., hydroxyethyl acrylate, tert-butyl acrylate and methyl methacrylate) by using a polymerization initiator (e.g., AIBN). The penetration reinforcing agent of the present invention contains a silicate compound containing an amine compound for inhibiting neutralization of concrete. The penetration reinforcing agent of the present invention is diffused inside concrete along pores of the concrete and directly reacts with concrete hydrates, thus achieving reinforcement of the concrete and improving the performance, e.g., waterproof performance, of a concrete structure.

The process for preparing the penetration reinforcing agent according to the present invention will be explained below. The composition A is prepared by the following process.

First, 50 to 95% by weight and preferably 70 to 90% by weight of at least one silicate compound selected from the group consisting of tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate and octadecyltriethoxyorthosilicate, 5 to 50% by weight and preferably 10 to 30% by weight of at least one monomer selected from the group consisting of tert-butyl acrylate, methyl methacrylate and hydroxyethyl acrylate, and an appropriate amount of a reaction catalyst are sequentially added to a reactor. Thereafter, the mixture is stirred at a speed of 30-100 rpm and preferably 40-80 rpm while introducing nitrogen gas into the reactor. Then, the mixture is continuously allowed to react for 5-10 hours and preferably 7-9 hours until the amount of ethanol discharged through a reflux condenser from the reactor becomes constant while maintaining the internal temperature of the reactor at 60-100° C. and preferably 80-90° C. The introduction of the nitrogen gas is stopped at a time point when ethanol is not discharged from the reactor any further or is discharged in an amount of less than 20% and preferably less than 5% of the amount discharged at the initial stage of the reaction. The temperature of the reaction product is lowered to 40° C. or less to prepare the final composition A.

The composition B is prepared by the following process.

First, 50 to 95% by weight and preferably 70 to 95% by weight of at least one silicate compound selected from the group consisting of tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate and octadecyltriethoxyorthosilicate, 5 to 50% by weight and preferably 5 to 30% by weight of diethanolamine, and an appropriate amount of a reaction catalyst are sequentially added to a reactor. Thereafter, the mixture is stirred at a speed of 30-100 rpm and preferably 40-80 rpm while introducing nitrogen gas into the reactor. Then, the mixture is continuously allowed to react for about 8 hours until the amount of ethanol discharged through a reflux condenser from the reactor becomes constant while maintaining the internal temperature of the reactor at 85° C. The introduction of the nitrogen gas is stopped at a time point when ethanol is not discharged from the reactor any further or is discharged in an amount of less than 5% of the amount discharged at the initial stage of the reaction. The temperature of the reaction product is lowered to 40° C. or less to prepare the final composition B.

The compositions A and B thus prepared have viscosities of 100 to 1,000 cps. The composition C is prepared by adding 0 to 50% by weight and preferably 10 to 30% by weight of the composition B to 50 to 100% by weight and preferably 70 to 90% by weight of the composition A and stirring the resulting mixture at a speed of 30-100 rpm and preferably 40-80 rpm for 10-60 minutes and preferably 20-40 minutes.

To make the composition C thus prepared water-repellent, less than 50% by weight and preferably 10-30% by weight of at least one silane selected from the group consisting of isobutyltriethoxysilane, isobutyltrimethoxysilane and n-octyltriethoxysilane is added to the composition C. The resulting mixture is stirred at a speed of 30-100 rpm and preferably 40-80 rpm for 10-60 minutes and preferably 20-40 minutes to prepare the composition D.

To identify the penetration depth and improve the penetration capability, 0.5 to 10 g and preferably 1.4 g of phenolphthalein is added to 90 to 99.5 g and preferably 98.6 g of ethanol having a purity of 95% or higher. The resulting mixture is slowly stirred to prepare the composition E. Phenolphthalein is an indicator that turns scarlet in an alkaline solution having a pH value of 8.2 to 10 or higher. Ethanol plays a role in improving the penetration of the mixture into concrete because of its very low viscosity and low surface tension. The composition E is mixed with the composition D to prepare the final penetration reinforced agent of the present invention. When the penetration reinforced agent is applied onto the surface of concrete, which has a high alkalinity (pH 12.5 or higher) due to the presence of calcium hydroxide in cement hydrates, it penetrates the concrete to develop scarlet, thus identifying the penetration depth. In addition, high penetration capability of the ethanol enables deeper penetration of the penetration reinforced agent into the concrete.

Specifically, less than 50% by weight and preferably 5 to 20% by weight of the composition E thus prepared is mixed with the composition D, followed by slow stirring to prepare the final penetration reinforced agent of the present invention.

Hereinafter, the present invention will be explained by the following seven examples, which were confirmed by a series of tests.

EXAMPLES

Example 1

Composition A: 60% by weight of tetraethylorthosilicate, 28.3% by weight of butyl acrylate, 9.7% by weight of methyl methacrylate and 2% by weight of hydroxyethyl acrylate were added to a polymerization reactor, and then AIBN as an polymerization initiator was added thereto. The mixture was allowed to react for 8 hours while maintaining the internal temperature of the reactor at 80° C. to prepare a composition A.

Composition B: 85% by weight of tetraethylorthosilicate, 14.17% by weight of diethanolamine and 0.83% by weight of p-toluenesulfonic acid were added to a reactor. Thereafter, the mixture was allowed to react for 8 hours while maintaining the internal temperature of the reactor at 85° C. to prepare a composition B.

Composition C: 80% by weight of the composition A was mixed with the 20% by weight of the composition B to prepare a composition C. The mixing was carried out done by stirring at a speed of 60 rpm for 30 minutes in a laboratory.

Composition D: 8% by weight of isobutyltriethoxysilane, 7% by weight of isobutyltrimethoxysilane and 5% by weight of n octyltriethoxysilane were added to 80% by weight of the composition C, and the mixture was slowly stirred for 10 minutes to prepare a composition D.

The viscosity of the composition D was measured by using a single-cylinder rotational viscometer in accordance with KS F 3705. Specifically, the viscosity of the composition D was determined using a Brookfield viscometer (DV-II$^+$), which measured a torque necessary to constantly rotate a spindle immersed up to a marked line in the composition D. As a result, the composition D was measured to have a viscosity of 550 cps. The surface tension of the composition D was determined by using a Du Nouy tensiometer, which is a tester commonly used in the engineering field. As a result, the composition D was measured to have a surface tension of 104 dyne/cm.

Example 2

First, the composition D prepared in Example 1 was stored and stabilized indoors at 23° C. for 24 hours. A composition E was prepared by the following process.

Composition E: 98.9% by weight of ethanol having a purity of 95% or higher was slowly stirred, and 1.4% by weight of phenolphthalein was slowly added dropwise thereto. The mixture was continuously stirred at a low speed until the phenolphthalein was completely dissolved to obtain a colorless transparent composition E.

Subsequently, 50, 30, 20, 10 and 5% by weight of the composition E were mixed with 50, 70, 80, 90 and 95% by weight of the composition D, respectively, followed by slow stirring for 10 minutes to prepare mixtures.

The viscosity of the mixtures was measured by using a single-cylinder rotational viscometer in accordance with KS F 3705. The surface tension of the mixtures was determined by using a Du Nouy tensiometer. The viscosity and the surface tension of the mixture thus obtained are shown in Table 1.

TABLE 1

| Weight ratio of composition D: composition E | Viscosity (cps) | Surface tension (dyne/cm) |
|---|---|---|
| 50:50 | 24 | 46 |
| 70:30 | 31 | 48 |
| 80:20 | 56 | 49 |
| 90:10 | 113 | 56 |
| 95:5 | 385 | 87 |

As can be seen from the data shown in Table 1, the viscosity and surface tension of the mixtures were lowered with increasing amount of the composition E. Further, there were small changes in the viscosity and surface tension when the weight ratio between the composition D and the composition E was not higher than 80:20. Accordingly, it is preferred that the amount of the composition E added be in the range of 5 to 20% by weight.

Example 3

To evaluate the color developing effects of the mixtures, the mixtures prepared in Example 2 were stored and stabilized indoors at 23° C. for 24 hours. Subsequently, cylindrical concrete specimens (100 mm (diameter)×200 mm (height)) were produced. Each of the above mixtures was applied thee times to each of the concrete specimens by using a spray gun at an interval of 5 minutes, and cured in a constant temperature/humidity chamber at a temperature of 23° C. and a relative humidity of 55% for 4 days. Each of the cured concrete specimens was divided into two equal parts and visually observed whether or not its color development was occurred. The color development of the cured concrete specimen according to the mixing ratio of the composition E was evaluated. The results are shown in Table 2.

TABLE 2

| Weight ratio of composition D: composition E | 50:50 | 70:30 | 80:20 | 90:10 | 95:5 |
|---|---|---|---|---|---|
| Surface color development | ○ | ○ | ○ | ○ | Δ |

*Note-
○: Distinct color,
Δ: Indistinct color,
X: No color observed

As is evident from the data shown in Table 2, when the amount of the composition E added was not less than 10% by weight, surface color development was distinctly observed.

Example 4

Concrete specimens for the compressive strength test were produced. The concrete specimens were produced by using ready mixed concrete (Remicon) under the same blending conditions. The blending conditions were as follows: Maximum dimension of coarse aggregates: 15 mm, target slump: 10 cm, and target air volume: 4.5±1.5%. The concrete specimens thus produced were cured in a constant temperature/humidity chamber at a temperature of 23° C. and a relative humidity of 55% for 3 days. After removal of a mold, the concrete specimens were cured in a water bath at 23° C. for 25 days. Table 3 shows the concrete blending design conditions.

TABLE 3

| Standard design compressive strength (kg/cm$^2$) | Water/cement ratio (%) | Fine Aggregates (%) | Unit weight (kg/m$^3$) | | | |
|---|---|---|---|---|---|---|
| | | | Water | Cement | Sand | Gravel |
| 240 | 48 | 46 | 178 | 370 | 771 | 891 |

Each of the mixture prepared in Example 2, the conventional mixture, which is used in the method of preventing dewing in a concrete building" disclosed in Korean Patent Laid-open No. 1998-076357, and the conventional mixture, which is the penetrative waterproofing agent disclosed in Korean Patent Laid-open No. 2001-0064300, was applied three times to each of three cylindrical concrete specimens (100 mm (diameter)×200 mm (length)) by using a spray gun at an interval of 5 minutes. The applied concrete specimens were wet-cured indoors at 23° C. for 24 hours. Subsequently, the wet-cured concrete specimens were cured in a constant temperature/humidity chamber at a temperature of 23° C. and a relative humidity of 60% for 4 days, and were tested for compressive strength in accordance with KS F 2405. The compressive strength test was conducted by applying a constant load of 1.5-3.5 kg/cm$^2$ per second to the cured concrete specimens by using a universal testing machine until the concrete specimens were destroyed. The compressive strength of the mixtures according to the present invention was evaluated. The results are shown in Table 4.

TABLE 4

| | Non-Treated | Weight ratio of composition D: composition E | | | | |
|---|---|---|---|---|---|---|
| | | 50:50 | 70:30 | 80:20 | 90:10 | 95:5 |
| Strength of concrete (kg/cm$^2$) | 246 | 253 | 268 | 281 | 297 | 309 |
| Strength ratio of concrete | 1 | 1.03 | 1.09 | 1.14 | 1.21 | 1.26 |

As can be seen from the data shown in Table 4, the compressive strength of the specimens was considerably increased with increasing weight of the composition D. Further, when the weight of the composition D was 80% by weight or more, an increase in compressive strength was above 14%. The reason why the compressive strength was increased with increasing weight of the composition D is believed to be because the silicate compound contained in the mixtures was hydrolyzed and polymerized by a sol-gel process and was bound to calcium silicate hydrates to form a three-dimensional network structure.

Table 5 shows the results of the mixtures described in the above patent publications for compressive strength.

TABLE 5

|  | Non-treated | Korean Patent Laid-open No. 1998-076357 | Korean Patent Laid-open No. 2001-0064300 |
| --- | --- | --- | --- |
| Strength of concrete (kg/cm$^2$) | 246 | 241 | 252 |
| Strength ratio of concrete | 1 | 0.98 | 1.02 |

As explained above, the method of preventing dewing in a concrete building" disclosed in Korean Patent Laid-open No. 1998-076357 comprises the steps of forming a waterproof sealing layer on the surface of concrete (first step), applying a cement-based compound to the concrete surface to form a waterproof coating layer (second step), and plastering a mortar, which is prepared by replacing a portion of water with a silicone emulsion, on the waterproof coating layer (third step). As can be seen from the data shown in Table 5, since the conventional mixture (Korean Patent Laid-open No. 1998-076357) comprises a silicone emulsion as a main component, the formation of a waterproof sealing layer was effective in preventing formation of dewing in a concrete building. However, it was found that the sealing agent applied to the surface of concrete to form the waterproof sealing layer in the first step had no concrete reinforcing effects. On the other hand, since the conventional mixture (Korean Patent Laid-open No. 2001-0064300) comprises sodium silicate, which is a kind of water glass, as a main component, it had concrete reinforcing effects due to the formation of bonds with cement hydrates. However, since the conventional mixture rapidly reacts with calcium hydroxide present on the surface of concrete, it does not readily penetrate deep into the concrete. Further, since the content of water in the conventional mixture is as high as 65-85% by weight, the amounts of compounds contributing to reinforcement of concrete after penetration of the conventional mixture into the concrete are relatively small, resulting in poor strength enhancing effects on the concrete.

Example 5

First, the composition D prepared in Example 1 was stored and stabilized indoors at 23°C. for 24 hours. A composition E was then prepared in accordance with the process described in Example 2.

Subsequently, 10% by weight of the composition E was mixed with 90% by weight of the composition D and the resulting mixture was slowly stirred for 10 minutes to prepare a penetration reinforcing agent An on-site test was conducted by applying the penetration reinforcing agent onto an upper plate of a concrete slab.

Specifically, an upper plate of a concrete slab was divided into eight squares (1 m×1 m) by using a marking pen and a tape, and impurities present on the concrete surface were removed by using a brush. Thereafter, 0.2 l, 0.4 l, 0.6 l and 0.8 l of the penetration reinforcing agent of the present invention were applied onto four squares by using a brush. For comparison, 0.4 l and 0.6 l of the conventional mixture (Korean Patent Laid-open No. 1998-076357) were applied onto two squares by using a brush, and 0.4 l and 0.6 l of the conventional mixture (Korean Patent Laid-open No. 2001-0064300) were applied onto two squares by using a brushAfter the slab, to which the respective mixtures were applied, was naturally cured (ie. allowing to stand in the air) for seven days, each three core (diameter: 50 mm) was collected from the squares of the slab. The penetration depth of the mixtures and the amount of water absorbed were measured. The penetration depth of the mixtures was measured in accordance with the test method 5.4.2.b of KS F 4930 "liquid-typed absorption-preventing agent for the surface coating of concrete". First, test pieces, to which the mixtures were applied, were divided into two equal parts. After the cross sections of the divided parts were sprayed with water, the thickness determined by a difference in the color of the concrete surface was measured. The amount of water absorbed was measured in accordance with the procedure of KS F 4930. First, test pieces were allowed to stand in a constant temperature humidity chamber at a temperature of 20±2° C. and a relative humidity of 65±5% for 8 days. The surfaces other than the surface of the cores, to which the mixtures were applied, were coated with an epoxy resin. After the coated cores were dipped in a thermostatic water bath at 20±2° C. for 24 hours, the amount of water absorbed was measured. The results are shown in Table 6.

TABLE 6

| Mixture | Applied amount (l) | Change in surface color | Penetration depth (mm) | Amount of water absorbed (g) |
| --- | --- | --- | --- | --- |
| Present invention | 0.2 | Not observed | 5 | 0.3 |
|  | 0.4 | Not observed | 12 | 0.2 |
|  | 0.6 | Not observed | 16 | 0.2 |
|  | 0.8 | Not observed | 21 | 0.2 |
| Korean Patent Laid-open No. 1998-076357 | 0.4 | Dark color | 0.4 | 0.4 |
|  | 0.6 | Dark color | 0.5 | 0.3 |
| Korean Patent Laid-open No. 2001-0064300 | 0.4 | Not observed | 3 | 1.2 |
|  | 0.6 | Not observed | 4 | 1.0 |

As can be seen from the data shown in Table 6, when the mixture prepared by the method of the present invention was applied onto the surface of concrete, there was no change in the color of the concrete surface and further the color became clean. On the contrary, when the conventional mixture (Korean Patent Laid-open No. 1998-076357) was applied onto the surface of concrete, the concrete surface was still sticky even 3 days after the application. In addition, the concrete surface was gradually darkened by the solvent used, and stains were observed due to the presence of impurities, such as dust, stuck to the concrete surface.

When the mixture prepared by the method of the present invention was applied in an amount not less than 0.4 l/m³, it penetrated to a depth of 10 mm or more. On the contrary, when the conventional mixtures (Korean Patent Laid-open Nos. 1998-076357 and 2001-0064300) were applied in an amount of 0.4 l/m³, they penetrated to depths of 0.4 mm and 3 mm, respectively. In addition, when the mixtures were applied in an amount of 0.6 l/m³, they penetrated to depths of 0.5 mm and 4 mm, respectively. Concrete is dried and shrunken by about 400 stains ($\times 10^{-6}$) over one year after casting, leaving many fine cracks (width: 0.2 mm or less, depth: 0.5 mm or less) on the concrete surface. Although the penetration reinforcing agent prepared by the method of the present invention was applied onto concrete and thereafter cracks were formed due to drying and shrinkage of the concrete, the present penetration reinforcing agent showed excellent waterproof effects and inhibitory effects on aging. On the contrary, after the conventional mixtures were applied onto concrete, cracks were formed due to drying and shrinkage of the concrete, resulting in destruction of waterproof layers. The test results associated with the amount of water absorbed reveal that the mixture prepared by the method of the present invention absorbed 0.2 g of water, indicating excellent waterproof effects, whereas the conventional mixture (Korean Patent Laid-open No.2001-0064300) absorbed 1.0 g or more of water, indicating poor waterproof performance.

From these test results, it could be confirmed that the mixture prepared by the method of the present invention showed good results in terms of change in the color of concrete surface, penetration depth and amount of water absorbed, whereas the conventional mixture (Korean Patent Laid-open No. 1998-076357) showed poor results in terms of change in the color of concrete surface and penetration depth, and the conventional mixture (Korean Patent Laid-open No. 2001-0064300) showed poor results in terms of penetration depth and amount of water absorbed.

Example 6

To evaluate the chloride blocking performance, 3.15 cc (0.4 l/m³) of the mixture prepared in Example 5 was applied onto the top surface of three cylindrical concrete specimens (100 mm (diameter)×200 mm (height)) (see, Table 3 in Example 4) by using a brush. Subsequently, the concrete specimens were wet-cured indoors at 23° C. for 24 hours. Subsequently, the wet-cured concrete specimens were cured in a constant temperature/humidity chamber at a temperature of 23° C. and a relative humidity of 60% for 2 days. After the surfaces other than the top surface of the cylindrical concrete specimens, to which the mixture was applied, were coated with an epoxy resin to induce the one-directional penetration of a chloride, the coated specimens were cured in a constant temperature/humidity chamber at a temperature of 23° C. and a relative humidity of 60% for 2 days. For comparison, the surfaces other than the top surface of three specimens, to which the mixture was not applied, were coated with an epoxy resin, followed by curing under the same conditions as above.

3.79 kg of NaCl (95 wt %) was dissolved in 1,000 l of distilled water to prepare salt water, and the cured concrete specimens were dipped therein. After 60 days of the dipping, the concrete specimens were taken out from the salt water and impurities present on the concrete surface were removed by using a sand paper. Then, concrete powder samples (each 20 g) were collected from depths of 10 mm and 20 mm below the concrete surface by using a concrete polishing machine. In accordance with the "method of measuring salt content in cured concrete" specified by the Japan Concrete Institute, the chloride was extracted from the concrete powder samples and its amount was measured by using AG-100 (K company, Japan) by using an ion electrode method. The results are shown in Table 7.

TABLE 7

| Sample | Amount of chloride ions at a depth of 10 mm (%) | Amount of chloride ions at a depth of 20 mm (%) |
| --- | --- | --- |
| Mixture-applied concrete | 0.001 | — |
| Non-applied concrete | 0.075 | 0.033 |

As can be seen from the results of Table 7, penetration of chloride ions was not substantially observed in the concrete specimens, to which the mixture prepared by the method of the present invention was applied, indicating that the mixture showed excellent chloride blocking performance. It is believed that when the present mixture was applied onto the surface of concrete, the silicate compound was bound to the other organic components to form an anti-aging layer up to a specified depth below the concrete surface, thus achieving excellent chloride blocking performance.

Example 7

To evaluate the neutral on inhibitory performance, concrete specimens were produced and cured in the same manner as in Example 6. The surfaces other than the top surface of the specimens were coated with an epoxy resin, followed by curing in the same manner as in Example 6. The cured specimens were allowed to stand in an accelerated neutralization tester at a carbon dioxide concentration of 10%, a temperature of 30±3° C. and a relative humidity of 60±5% for 90 days, and were taken out from the tester. The neutralization depth of the specimens was measured by the phenolphthalein method using a 1% phenolphthalein solution. The results are shown in Table 8.

TABLE 8

| Sample | Mixture-applied concrete | Non-applied concrete |
| --- | --- | --- |
| Neutralization depth | 0.1 mm | 27 mm |

As can be seen from the results of Table 8, the concrete specimens, to which the mixture prepared by the method of the present invention was applied, were neutralized to a depth of 0.1 mm, indicating excellent neutralization inhibitory performance. It is believed that when the present mixture was applied onto the surface of concrete, the silicate compound was bound to the other organic components to form an anti-aging layer and a concrete reinforcing layer up to a specified depth below the concrete surface, thus achieving excellent neutralization inhibitory performance.

An explanation of the method of applying the penetration reinforcing agent to concrete according to the present invention will be provided below.

The penetration reinforcing agent of the present invention, which is prepared by using a silicate compound and one or more monomers, is applied onto the surface of concrete by using an instrument, such as a spray gun, a sprayer, a roller or a brush, 28 days after casting of the concrete. 7 days after the application, an improvement in the durability of the concrete structure was exhibited. That is, the penetration reinforcing agent of the present invention improves the durability of newly constructed concrete structures. In addition, the penetration reinforcing agent of the present invention improves the performance of already constructed concrete structures without removal of concrete whose performance is deteriorated.

The present invention is not to be construed as being limited to the preferred embodiment Those skilled in the art will readily recognize and appreciate that various modifications can be made without departing from the scope and spirit of the invention and such modifications are intended to come within the scope of the appended claims.

As apparent from the above description, the present invention provides a penetration reinforcing agent, a process for preparing the penetration reinforcing agent and a method of applying the penetration reinforcing agent onto concrete. The penetration reinforcing agent of the present invention has low volatility at room temperature due to its high boiling point. In addition, the penetration reinforcing agent of the present invention shows high penetration capability into concrete. Furthermore, the penetration reinforcing agent of the present invention penetrates deep into cracks or pores of concrete, through which water leaks, and fills the interstices, so that the penetration of water is prevented and the strength of the concrete is enhanced. When the penetration reinforcing agent of the present invention is applied onto a concrete structure, it is rapidly diffused into the concrete due to capillary suction to form a physically/chemically stable concrete reinforcing layer within the concrete structure. Therefore, the penetration reinforcing agent of the present invention is highly effective in preventing aging and improving the durability performance of general concrete structures, power plant structures (e.g., hangar and auxiliary buildings of atomic power plants) and concrete structures in marine environment (e.g., seawater intake structures). Moreover, the penetration reinforcing agent of the present invention shows excellent anti-aging effects even in power transmission and distribution systems, such as power cables.

What is claimed is:

1. A process for preparing a penetration reinforcing agent, the process comprising the steps of:
   mixing a silicate compound with one or more monomers to prepare a composition A;
   mixing a silicate compound with an amine compound to prepare a composition B;
   mixing the said composition A with the said composition B to prepare a composition C;
   mixing the said composition C with a silane compound to prepare a composition D;
   adding phenolphthalein to ethanol to prepare a composition E; and
   mixing the said composition D with the said composition E to prepare the penetration reinforcing agent.

2. The process according to claim 1, wherein the step of preparing the said composition A includes the sub-steps of:
   adding at least one silicate compound selected from the group consisting of tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate and octadecyltriethoxyorthosilicate, at least one monomer selected from the group consisting of tert-butyl acrylate, methyl methacrylate and hydroxyethyl acrylate, and an appropriate amount of a reaction catalyst to a reactor (first sub-step);
   stirring the mixture while introducing nitrogen gas into the reactor (second sub-step);
   sustaining the reaction until the amount of ethanol discharged through a reflux condenser from the reactor becomes constant while maintaining the internal temperature of the reactor constant (third sub-step); and
   stopping the introduction of the nitrogen gas at a specific time point and lowering the temperature of the reaction product to 400°C. or less (fourth sub-step).

3. The process according to claim 2, wherein the said first sub-step is carried out by mixing 50 to 95% by weight of the silicate compound with 5 to 50% by weight of the monomer.

4. The process according to claim 2, wherein the said second sub-step is carried out by stirring the mixture at a speed of 30-100 rpm.

5. The process according to claim 2, wherein the said third sub-step is carried out by allowing the mixture to react for 5-10 hours while maintaining the internal temperature of the reactor at 60-100° C.

6. The process according to claim 2, wherein, in the said fourth sub-step, the specific time point is when ethanol is not discharged from the reactor any further or is discharged in an amount of less than 20% of the amount discharged at the initial stage of the reaction.

7. The process according to claim 1, wherein the step of preparing the said composition B includes the sub-steps of:
   adding at least one silicate compound selected from the group consisting of tetraethylorthosilicate, tetramethylorthosilicate, trimethylmethoxyorthosilicate, trimethylethoxyorthosilicate, dimethyldimethoxyorthosilicate, dimethyldiethoxyorthosilicate, methyltrimethoxyorthosilicate, methyltriethoxyorthosilicate, tetramethoxyorthosilicate, tetraethoxyorthosilicate, methyldimethoxyorthosilicate, methyldiethoxyorthosilicate, dimethylethoxyorthosilicate, dimethylvinylmethoxyorthosilicate, dimethylvinylethoxyorthosilicate, methylvinyldimethoxyorthosilicate, methylvinyldiethoxyorthosilicate, diphenyldimethoxyorthosilicate, diphenyldiethoxyorthosilicate, phenyltrimethoxyorthosilicate, phenyltriethoxyorthosilicate, octadecyltrimethoxyorthosilicate and octadecyltriethoxyorthosilicate, and diethanolamine, and an appropriate amount of a reaction catalyst to a reactor (first sub-step);
   stirring the mixture while introducing nitrogen gas into the reactor (second sub-step);
   sustaining the reaction until the amount of ethanol discharged through a reflux condenser from the reactor becomes constant while maintaining the internal temperature of the reactor constant (third sub-step); and stopping the introduction of the nitrogen gas at a specific time point and lowering the temperature of the reaction product to 40° C. or less (fourth sub-step).

8. The process according to claim 7, wherein the said first sub-step is carried out by mixing 50 to 95% by weight of the silicate compound with 5 to 50% by weight of diethanolamine.

9. The process according to claim 7, wherein the said second sub-step is carried out by stirring the mixture at a speed of 30-100 rpm.

10. The process according to claim 7, wherein the said third sub-step is carried out by allowing the mixture to react for 5-10 hours while maintaining the internal temperature of the reactor at 60-100° C.

11. The process according to claim 7, wherein, in the said fourth sub-step, the specific time point is when ethanol is not discharged from the reactor any further or is discharged in an amount of less than 5% of the amount discharged at the initial stage of the reaction.

12. The process according to claim 1, wherein the step of preparing the said composition C is carried out by mixing at least 50% by weight of the composition A with less than 50% by weight of the composition B and stirring the mixture at 30-100 rpm for 10-60 minutes.

13. The process according to claim 12, wherein the step of preparing the said composition C is carried out by mixing 70 to 90% by weight of the said composition A with 10 to 30% by weight of the said composition B and stirring the mixture at 40-80 rpm for 20-40 minutes.

14. The process according to claim 1, wherein the step of preparing the said composition D is carried out by adding less than 50% by weight of at least one silane compound selected from the group consisting of isobutyltriethoxysilane, isobutyltrimethoxysilane and n-octyltriethoxysilane to the said composition C and stirring the mixture at 30-100 rpm for 10-60 minutes.

15. The process according to claim 14, wherein the step of preparing the said composition D is carried out by adding 10 to 30% by weight of at least one silane compound selected from the group consisting of isobutyltriethoxysilane, isobutyltrimethoxysilane and n-octyltriethoxysilane to the said composition C and stirring the mixture at 40-80 rpm for 20-40 minutes.

16. The process according to claim 1, wherein the step of preparing the said composition E is carried out by adding 0.5 g to 10 g of phenolphthalein to 90 g to 99.5 g of ethanol having a purity of 95% or higher and stirring the mixture.

17. The process according to claim 16, wherein the step of preparing the said composition E is carried out by adding 1.0 g to 1.5 g of phenolphthalein to 95 g to 98.6 g of ethanol having a purity of 95% or higher and stirring the mixture.

18. The process according to claim 1, wherein the step of mixing the said composition D with the said composition E is carried out by mixing less than 50% by weight of the said composition E with the said composition D and stirring the mixture.

19. The process according to claim 18, wherein the step of mixing the said composition D with the said composition E is carried out by mixing 5 to 20% by weight of the said composition E with the said composition D and stirring the mixture.

* * * * *